United States Patent
Merte et al.

(10) Patent No.: US 7,783,386 B2
(45) Date of Patent: Aug. 24, 2010

(54) DEVICE AND METHOD FOR SAFEGUARDING A MACHINE-CONTROLLED HANDLING DEVICE

(75) Inventors: Rolf Merte, Wiesloch (DE); Björn Matthias, Bad Schönborn (DE); Sönke Kock, Västerås (SE)

(73) Assignee: ABB Research Ltd, Zurich (CH)

( * ) Notice: Subject to any disclaimer, the term of this patent is extended or adjusted under 35 U.S.C. 154(b) by 746 days.

(21) Appl. No.: 11/661,290

(22) PCT Filed: Aug. 23, 2005

(86) PCT No.: PCT/EP2005/009098

§ 371 (c)(1),
(2), (4) Date: Feb. 27, 2007

(87) PCT Pub. No.: WO2006/024431

PCT Pub. Date: Mar. 9, 2006

(65) Prior Publication Data

US 2008/0021597 A1   Jan. 24, 2008

(30) Foreign Application Priority Data

Aug. 27, 2004   (DE) .................. 10 2004 041 821

(51) Int. Cl.
*G05B 19/04* (2006.01)
*G05B 19/18* (2006.01)

(52) U.S. Cl. .............. 700/255; 340/500; 340/540; 340/541; 340/679; 307/117; 348/152; 901/46; 901/47

(58) Field of Classification Search .......... 700/255, 700/123; 340/500, 540, 541, 556, 679; 250/221; 307/117; 348/143, 152; 345/420; 901/46, 901/47

See application file for complete search history.

(56) References Cited

U.S. PATENT DOCUMENTS

| | | | | |
|---|---|---|---|---|
| 4,674,057 A | * | 6/1987 | Caughman et al. | 700/258 |
| 4,710,020 A | * | 12/1987 | Maddox et al. | 356/3.13 |
| 4,736,116 A | * | 4/1988 | Pavlak et al. | 307/41 |
| 4,751,658 A | * | 6/1988 | Kadonoff et al. | 701/301 |

(Continued)

FOREIGN PATENT DOCUMENTS

DE   37 00 009 A1   7/1988

(Continued)

OTHER PUBLICATIONS

German Search Report issued Feb. 13, 2008 in corresponding German Patent Application No. 10 2004 041 821.7.

*Primary Examiner*—Khoi Tran
*Assistant Examiner*—Jaime Figueroa
(74) *Attorney, Agent, or Firm*—Buchanan Ingersoll & Rooney PC (57) ABSTRACT

An apparatus and method is disclosed for protection of a machine-controlled handling appliance having moving parts, having a safety sensor system for detection of objects in the working area of the handling appliance, having a safety controller which interacts with the handling appliance controller and in the process controls safety-relevant handling appliance functions as a function of signals from the safety sensor system. The safety sensor system has non-contacting proximity sensors so that a safety-relevant part of the working area of the handling appliance is covered by the detection areas of the proximity sensors.

27 Claims, 3 Drawing Sheets

U.S. PATENT DOCUMENTS

| | | | | |
|---|---|---|---|---|
| 4,772,875 | A | * | 9/1988 | Maddox et al. ............. 340/522 |
| 4,777,416 | A | * | 10/1988 | George et al. ......... 318/568.12 |
| 4,804,860 | A | | 2/1989 | Ross et al. |
| 4,829,442 | A | * | 5/1989 | Kadonoff et al. ............ 701/207 |
| 5,280,622 | A | * | 1/1994 | Tino ......................... 700/255 |
| 5,361,023 | A | * | 11/1994 | Kim ...................... 318/568.16 |
| 5,495,576 | A | * | 2/1996 | Ritchey ...................... 345/420 |
| 5,758,298 | A | * | 5/1998 | Guldner ....................... 701/23 |
| 5,956,465 | A | * | 9/1999 | Takagi et al. ............... 700/255 |
| 6,055,042 | A | * | 4/2000 | Sarangapani ............... 356/4.01 |
| 6,617,845 | B1 | * | 9/2003 | Shafiyan-Rad et al. . 324/207.16 |
| 6,683,432 | B2 | * | 1/2004 | Griffis .................. 318/568.16 |
| 7,167,775 | B2 | * | 1/2007 | Abramson et al. .......... 700/245 |
| 2001/0027352 | A1 | * | 10/2001 | Morita et al. ............... 700/123 |
| 2002/0186299 | A1 | | 12/2002 | Cofer |
| 2003/0137219 | A1 | * | 7/2003 | Heiligensetzer et al. ..... 310/328 |
| 2004/0089793 | A1 | * | 5/2004 | Watanabe et al. ........... 250/221 |
| 2004/0218317 | A1 | * | 11/2004 | Kawazu et al. ................. 361/1 |
| 2005/0063114 | A1 | * | 3/2005 | Suhara et al. ................ 361/62 |
| 2005/0166413 | A1 | * | 8/2005 | Crampton .................... 33/503 |
| 2006/0076048 | A1 | * | 4/2006 | Gaudiana et al. ............ 136/246 |

FOREIGN PATENT DOCUMENTS

| | | |
|---|---|---|
| DE | 42 35 161 A1 | 5/1993 |
| DE | 93 12 840.1 U1 | 2/1994 |
| DE | 101 52 543 A1 | 5/2003 |
| DE | 101 62 412 A1 | 7/2003 |
| DE | 103 24 628 A1 | 12/2004 |
| EP | 0 170 705 | 8/1985 |
| EP | 0 264 350 | 10/1987 |
| EP | 0 435 816 A1 | 7/1991 |
| FR | 2 478 514 A | 9/1981 |
| WO | WO 03/001967 A1 | 3/2003 |

* cited by examiner

DEVICE AND METHOD FOR SAFEGUARDING A MACHINE-CONTROLLED HANDLING DEVICE

The invention relates to an apparatus for protection of a machine-controlled handling appliance having moving parts, as well as to a method for protection of a machine-controlled handling appliance having moving parts.

In this case, based on the description in "Automatisierungstechnik in der Fertigung [Automation in manufacturing], 2nd Edition 1996, Verlag Europa Lehrmittel, ISBN 3-8085-5152-6, pages 317 to 318" the expression handling appliances is in this case intended to mean not only machine-controlled, fixed-programmed so-called pick-and-place appliances, for example appliances for feeding a press, for assembly of mass-produced items or for packaging of mass-produced products, but also automatic movement machines which can be used universally and have a plurality of axes, and whose movements are freely programmable in terms of the movement sequence and movement path, so-called industrial robots.

Industrial robots in particular are used in many industrial fields. They move heavy parts, work in dangerous atmospheres, and, because of their good repetition accuracy, are optimally suitable for carrying out reproducible processes at high speed, and are operational all the time, except for maintenance phases.

In order to ensure the safety of people in the vicinity of handling appliances of this generic type, the Professional Society in Germany has licensed clear and strict guidelines for personnel protection. The current prior art for implementation of these guidelines often leads to the use of separate protective devices around the area of the handling appliance. The danger area is bounded by a mechanical fence. This prevents access to a running machine system, since the separate protective devices separate the locations of the operator and installation. Safety systems such as these are used in industry because they ensure the maximum safety and are easy to implement. The accesses to the protected installation must be designed so as to prevent unnoticed access to the machine. Guard gates are used for this purpose, which pass on their state (open or closed) by means of a switch to an emergency-off controller, and can thus shut down the machine working process. As an alternative to fences, light grids or light fences are used, provided by light barriers or laser scanners. These either switch the machine off immediately, or switch it to a safe state, for example to movement at a much lower speed, when an object interrupts the beam path.

If an installation is provided with an isolating protective apparatus, the safety of the configuration must be inspected by an authorized person. Furthermore, particularly in the case of robots, the fence may impede flexible handling of the robot in some applications since, if the robot is physically moved, the fence must be readapted and wired with safety switches. This effort leads to additional costs and lengthens the conversion times. This applies in particular to installations which are designed to move to carry out flexible work, in order to allow them to be used at different locations, so-called portable robot systems, since in this case the danger area changes whenever the position of the industrial robot is moved, and the isolating protective device must therefore be reconfigured and inspected again. This is highly disadvantageous with regard to the capability to use the industrial robot system flexibly.

Furthermore, isolating protective devices impede interaction with the machine. In some cases, this can lead to safety functions being bridged for convenience reasons. In this case, all of the safety functions are lost, and this is an unacceptable state from the safety point of view.

DE 101 52 543 discloses a method and an apparatus for controlling a safety-relevant function of a machine, in which a monitoring area is monitored by at least one position-resolving and time-resolving sensor. The sensor identifies the position, the movement direction and/or movement speed of a person. A safety limit or a safety area limits a danger area and defines a safety distance from the machine. If the danger area is entered, the safety-relevant function is stopped, for example an emergency stop. The position of the safety limit and/or the extent of the safety area is or are defined variably, depending on the situation, as a function of the position, the movement direction and/or the movement speed. A camera or a laser scanner is used as the position-resolving and time-resolving sensor. The sensor monitors the entire working area, including the robot arm. The position, the movement direction and/or the movement speed are/is determined from the sensor signals in an evaluation unit. The method to be used specifically in this case is not described in any more detail in DE 101 52 543 A1, although, to a person skilled in the art, this implicitly appears to be a highly complex process of real-time image processing, thus necessitating considerable complexity in terms of computation capacity and hardware in the evaluation unit. A specific object classification system is required in order to distinguish between people and objects and in order to appropriately adapt the safety-relevant function. In addition, this requires considerable additional complexity in terms of computer power and hardware. Furthermore, a system according to DE 101 52 543 is not suitable for portable robot applications because, when the robot position is changed, the camera must be readjusted and set again, requiring considerable operator effort.

Against the background of the already known prior art, the object of the invention is therefore to specify an apparatus and a method for monitoring of the working area around a handling machine, in particular around a robot, such that the protective fences which have been required until now are superfluous while nevertheless providing maximum operator safety, with the aim of the apparatus being of simple design and also being suitable for portable robot systems.

With regard to the apparatus and the method, the object is achieved by the characterizing features of exemplary embodiments.

Thus, according to the invention, the safety sensor system has non-contacting proximity sensors so that a safety-relevant part of the working area of the handling appliance is covered by the detection areas of the proximity sensors. In one advantageous refinement of the invention, the safety sensor system may also have a combination of position-resolving and time-resolving sensors and non-contacting proximity sensors, or a combination of position-resolving and time-resolving sensors, non-contacting proximity sensors and mechanical limit switches or contact mats.

In this case, the proximity sensors can transmit information about the presence of an object in their respective detection area and about the distance of the object from the respective sensor to the safety controller. In this case, according to a further highly advantageous refinement option of the apparatus according to the invention, the proximity sensors can suppress information about the presence of an object which is located in their detection area during the transmission to the safety controller if the object is located in a specific permissible distance range from the proximity sensor.

The protective fences which have been required in the past are therefore superfluous. However, existing protective fences need not be removed, for example in the case of retrospective installation of the apparatus according to the invention. This then results in advantageous additional safety.

The proximity sensors may be proximity switches with variably adjustable switching distances, so that they transmit information about the presence of an object in their respective monitoring area and within a range which corresponds to the respectively selective switching distance, from the proximity sensor to the safety controller.

In another particularly advantageous refinement of the apparatus according to the invention, the safety-relevant part of the working area can be subdivided into sectors, with each sector having an associated non-contacting proximity sensor or a position-resolving and time-resolving sensor as the sector monitoring sensor, whose detection area corresponds to the sector associated with it. In this case, each sector which is associated with one proximity sensor can be subdivided into at least two zones of different safety relevance, with the safety relevance corresponding to the distance from the moving parts of the handling appliance.

An apparatus according to the invention is particularly advantageous in which each sector which is associated with one proximity sensor is subdivided into a working zone, a safety zone and a danger zone, in such a manner that the handling appliance is switched off if someone is present in the danger zone and the handling appliance is switched to a slower safety mode if someone is present in the safety zone.

The proximity sensors may have ultrasound sensors or microwave sensors.

The handling appliance may be a freely programmable industrial robot. In this embodiment, the safety sensors can be fitted in a highly advantageous manner to the robot base in such a manner that the working area of the robot is monitored from the base, starting from the inside, outwards. In this case, information about the position of the robot arm is recorded by position-finding sensors on the robot axes, and is transmitted to the safety controller.

In the case of a method according to the invention for protection of a machine-controlled handling appliance having moving parts, a safety sensor system is used for detection of objects in the working area of the handling appliance, in such a manner that a safety controller interacts with the handling appliance controller, and the safety controller controls safety-relevant handling appliance functions as a function of signals from the safety sensor system. In this case, information about the presence of people and/or objects in the working area of the handling appliance is determined zone-by-zone by the safety sensor system and is transmitted to the safety controller. Furthermore, information about the position of the moving part or parts of the handling appliance is transmitted zone-by-zone from the handling appliance to the safety controller, and safety-relevant handling appliance functions are controlled zone-by-zone by the safety controller by interaction with the handling appliance controller and as a function of both types of information.

In particular, the handling appliance may be a freely programmable industrial robot whose working area is subdivided into sectors, and each sector is further subdivided into at least two zones of different safety relevance, corresponding to the distance from the moving robot arm. Information about the position of the robot arm is in this case detected by position sensors on the robot axes, and is transmitted to the safety controller.

Furthermore, each sector can be subdivided into a working zone, a safety zone and a danger zone.

When the safety sensor system identifies that someone is present in the danger zone, the robot is then switched off, and when someone is present in the safety zone, the robot can be switched to a slower safety mode by the robot controller.

In a further variant of the invention, when the safety sensor system identifies the presence of someone in a safety zone and, at the same time, the position sensors detect that the robot arm is positioned in the same safety zone or in an adjacent safety zone, the robot can likewise be switched by the robot controller to a slower safety mode.

According to one highly advantageous refinement of the invention, the safety sensor system can be fitted selectively, in such a manner as to achieve specific monitoring of defined areas and such that self-interference (that is to say initiation of the safety-relevant robot function by the robot arm itself) or disruption by parts to be handled by the robot, or feed apparatuses for such parts, is not possible. The area to be monitored is subdivided into sectors by the sensors having a characteristic beam angle. The operating area of the sensors can be provided with a window function (provided by electronics) which masks out those areas in which the robot is moving, or in which the parts to be handled by the robot or the feed apparatuses for such parts are located.

In addition to the avoidance, it is likewise possible to suppress a sensor signal when the robot is moving into the area of a sensor. This can be achieved by position-finding sensors, for example position switches, on suitable robot axes. In this case, the various sensor data items are logically linked in the safety controller.

The area in which the robot is located is filtered out of the determined sensor data by evaluation of the position data. This is done by matching and comparison of the determined sensor data with the position data which, is provided by the position-finding sensors on the robot. Furthermore, a numerical model of the robot geometry that has been considered can also be used to allow even more accurate differentiation between a real disturbance and self-disturbance.

In the case of a static arrangement (in which the geometry of the workplace never changes), the surrounding area, including the parts to be handled by the robot or feed apparatuses for such parts can alternatively be recorded once, with the values obtained in this way being used as a reference. Only changes from the reference values are then considered during actual operation.

Overall, the advantage of the apparatus according to the invention is that it provides the capability for flexible and selective monitoring of the working area to be monitored of a handling appliance, with the capability to mask out various areas. A safety apparatus, which is provided by sensors, for protection of people is described for this purpose, relating to handling systems of a portable, mobile or stationary type, in particular robots.

The invention provides a safety sensor system by means of which the mechanical isolating protective device around the handling appliance is replaced by a more flexible, cheaper safety apparatus, whose overall complexity is greatly simplified. The operator and the machine need no longer be physically separated. The safety sensor system according to the invention allows someone to remain in a safety zone of the handling appliance while the machine is working at the same time at a different part of the danger area. In addition to the advantages that have already been mentioned, this also allows further advantages for people to be combined with those for the machines in one working process. If a person moves into an area which is dangerous to him or her, then the robot is switched off, or its speed is slowed down to a permissible maximum speed at which no safety measures are required.

The safety sensor system according to the invention in general has sensors for reliable personnel detection. In this case, different sensors such as ultrasound, laser scanners, a light curtain, contact mats, radar, etc. can also interact. In particular, as a further embodiment, it is possible to use a combination of different sensors which monitor the same safety area but operate on the basis of a different physical principle. This redundancy further improves the safety.

The output signals from the safety sensor system are processed in such a manner that the sensors can be used compatibly in the industrial field. In the case of the proximity sensors that are used according to the invention, signal processing electronics can convert the output signal to a standardized, analog current or voltage signal which is proportional to the detected distance. Furthermore, safety sensors can be used as digital switches, that is to say they trip at a defined distance. In this case, electronics can also convert the output signal to a standardized digital signal. The proximity sensors that have been mentioned and are used according to the invention are already widely available nowadays and have been proven in industrial use in automation systems.

The safety sensor system for detection of people passes its information to a safety controller which, for example, may be a safety programmable logic controller (PLC). This may be a safety controller of redundant design, which is connected directly to the robot controller and, if required, can also itself control a higher-level emergency-off function.

In addition to the non-contacting proximity sensors that have been mentioned, it is also possible for different types of sensors or further safety precautions, such as contact mats, to be connected to the safety controller. The program which is stored in the safety controller controls the required actions when a safety sensor produces a signal.

One advantageous possible way to provide proximity sensors for a flexible safety sensor system according to the invention is to use microwaves, that is to say electromagnetic waves in the GHz range. Electromagnetic waves propagate at the speed of light in space and are not susceptible to disturbances from typical environmental influences, such as temperature and pressure fluctuations, and visibility conditions and the like. As their use in the mobile communications and satellite field has become widespread, microwave components have also become highly cost-effective, so that this allows a low-cost and reliable sensor to be provided for personnel and disturbance body detection.

One possible operating mode for a microwave-based proximity sensor is the so-called FMCW method (frequency-modulated continuous wave) or else "frequency wobbling". In a microwave sensor using this operating mode, a signal is generated whose frequency varies linearly. The variation takes place continuously and cyclically, that is to say the frequency is moved up and down a defined frequency band. The width and the range of the frequency band cover the maximum resolution that can be achieved, that is to say the accuracy of the sensor.

This signal is emitted via an antenna connected to the sensor. When it strikes an obstruction, then a portion of the power is reflected, and is sent back to the receiver, while the frequency of the received signal is compared with the frequency of the signal that has been transmitted at that time. The reflected wave frequency differs from that of the wave which has been transmitted at that time. The difference between the transmitted signal and received signal frequency is accordingly proportional to the delay time, and is thus proportional to the range.

The spectrum of the difference signal contains the sought range information from the area surrounding the sensor. The signal is evaluated by fast Fourier transformation (FFT); the resultant sensor signal thus represents the distance of the identified object from the sensor.

For applications in which the aim is to additionally use the microwave-based safety sensor system to identify objects approaching from a different direction as well, tangential resolution of the sensor signal must also be implemented. This can be done in three different ways.

In a first mode, as in the case of an air monitoring radar, the microwave sensor is mounted on an apparatus which can be scanned. The scanning angle is detected by means of an angle sensor. In this mode, a narrow antenna main beam can be scanned mechanically and can thus scan the detection area of the microwave sensor in the tangential direction. When an object is identified, the direction in which the object is located is recorded by means of the angle sensor.

A second possible way to scan the main beam is to drive individual elements in an antenna array via a variable phase-shifting network, and thus to scan the antenna main lobe of the microwave sensor electrically, so to speak, by variation of the phases. This allows mechanical tangential scanning to be carried out electronically, in a considerably more flexible manner. Owing to the lack of friction, the scanning rate is in this case considerably faster than in the case of mechanically moving antennas.

A third possibility is to use a plurality of sensors with a broader main beam. Sector subdivision results in the reflected signal being associated with one sensor, and thus in a rough direction indication. The intensities of the various sector signals can be evaluated for direction determination.

A further advantageous possible way to provide proximity sensors for a flexible safety sensor system according to the invention is to use ultrasound for object detection. As is known, this is based on the effect of sound waves being reflected on solid bodies. Since the speed at which the sound propagates is known, the range can be determined from the delay time. Ultrasound sensors have a beam angle from about 10° to 40°, preferably from about 12° to 30°. The use of ultrasound sensors thus subdivides the area to be monitored into sectors with beam angles of about 10° to 40°, preferably from about 12° to 30°. This subdivision results in rough tangential resolution.

In order to also avoid identification of parts to be handled by the machine or of feed devices for such parts, or for example of the robot arm itself when it or they are located in the area to be monitored, thus triggering the safety function, thought must be applied to how this can be avoided. Controllers for ultrasound sensors offer the capability to provide the effective area with a window function, that is to say specific areas such as those mentioned above can be masked out in this way.

A further embodiment is the combination of an ultrasound or microwave sensor for monitoring of a zone with a further sensor which monitors the same zone, but operates on the basis of a different physical principle, for example a PIR (passive infrared sensor) or an ultrasound sensor. Once again redundancy improves the safety in this case.

Further advantageous refinements and improvements of the invention, as well as further advantages, can be found in exemplary embodiments described herein.

The invention as well as advantageous refinements of the invention will be explained and described in more detail with reference to the drawings, in which three exemplary embodiments of the invention are illustrated, and in which.

Figure 1:
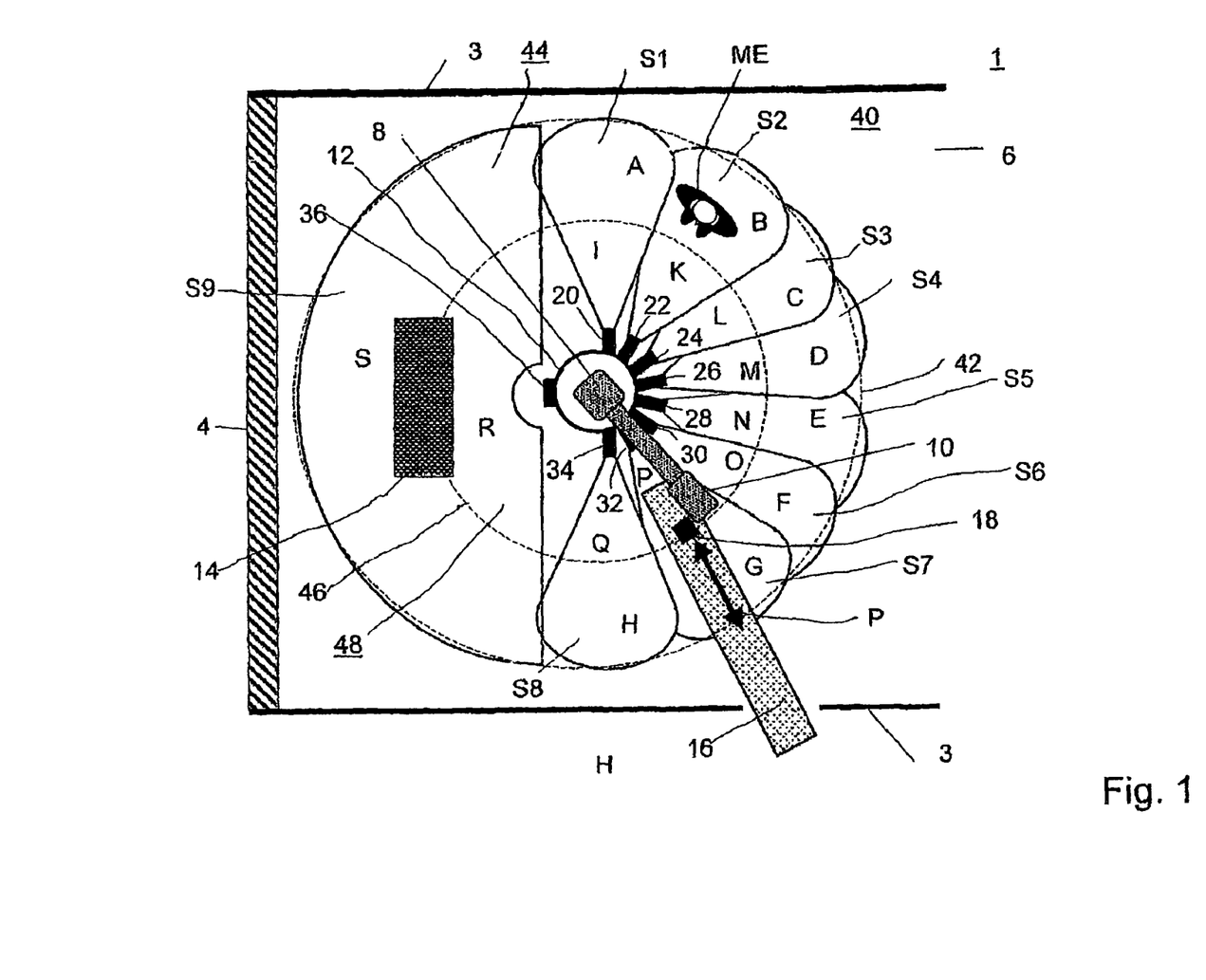
FIG. 1 shows an apparatus according to the invention, having ultrasound sensors and a laser scanner.

FIG. 1 shows a plan view of a manufacturing cell 1, having side boundary devices 3 and a rearward boundary device 4. The rearward boundary device 4 may be a fence, while the side boundary devices 3 may, for example, be simple colored lines on the workshop floor, or else light barriers. The manufacturing cell is accessible and can be entered from the front 6.

An industrial robot 8 with an assembly tool attached to the robot hand 10 is positioned in the manufacturing cell and may, for example, be welding pliers or a drill, or some other tool which is suitable for robot use and is known per se. The area within the manufacturing cell that can be entered forms the working area 40 of the robot 8.

The robot 8 is mounted on a base 12 such that it can rotate about a vertical rotation axis. The base 12 may be firmly connected to the floor of the manufacturing cell 1. However, this may also be a portable robot, in which case the base is designed such that it can be moved, and the robot can be moved to different positions within the manufacturing cell 1, or even to positions outside the manufacturing cell 1.

Within the working area 40, there is a danger area 48 which is bounded by a danger area boundary line 46. If someone is located within the danger area 46, then he or she is within range of the robot arm and there is a high risk to him or her of colliding with the robot arm in the course of its movements on its programmed movement path.

A safety area 44, which is adjacent to the danger area on the outside, is characterized in that a person ME may possibly quickly and unexpectedly enter the danger area from this safety area, and may collide with the robot arm there. A safety area boundary line 42 forms the boundary between the safety area and the working area which surrounds this on the outside. It is not critical for someone to be located in the working area 40, and there is no danger here.

The robot 8 uses its tool 10 to process work pieces 18 which are fed to it on a work piece feed device 16, in this case by way of example a conveyor belt, from outside the manufacturing cell, passing through the working area and safety area, with these work pieces 18 being passed out again as well, after being processed. A tool station 14 is located between the rear wall 4 and the robot 8 and has to move towards the robot arm from time to time, in order to change its tool.

The manufacturing cell configuration shown here should, of course, be regarded only as a schematic example with reference to which the invention as well as its advantages will be explained in an exemplary form. The technical teaching of the invention can, of course, also be applied to all other feasible and possible constellations of manufacturing cells with robots or else with pick-and-place appliances.

Eight non-contacting proximity sensors 20, 22, 24, 26, 28, 30, 32, 34 are fitted to the base 12 of the robot 8 in a semicircle pointing towards the access side 6, and operate on the ultrasound principle. The detection area of each of these ultrasound proximity sensors is defined by a lobe-like sector S1, S2, S3, S4, S5, S6, S7, S8, which has a beam angle of about 30°. Each of the ultrasound proximity sensors has sensor electronics, see 20a, 22a, 24a, 26a, 28a, 30a, 32a, 34a in FIG. 3, by means of which the presence of an object within the detection area associated with that sensor can be identified, and its distance from the sensor can be determined. The sensor electronics produce an output signal which has been standardized in accordance with any desired industry standard (for example 0-10V, 4-20 mA) and contains the two information items just mentioned (specifically binary information "object present or not" and analog information "distance from the object to the sensor". The sensor signal is transmitted via a sensor bus, to which the proximity sensors are connected, to a safety controller, as shown in FIG. 3.

Figure 3:
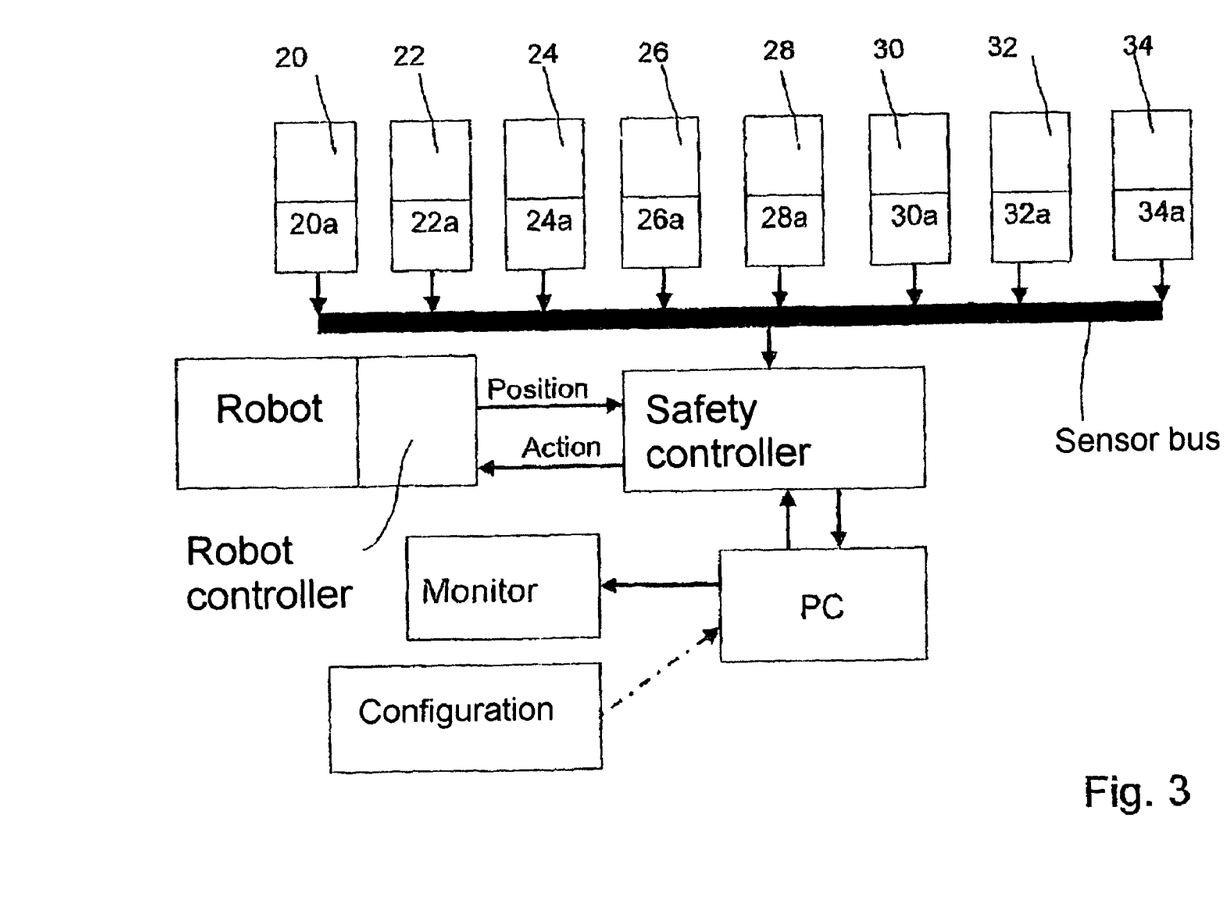
FIG. 3 shows a block diagram of the apparatus according to the invention as shown in FIG. 1.

FIG. 3 shows a block diagram of the functional blocks required in addition to those shown in FIG. 1 in order to operate an apparatus according to the invention using a method according to the invention.

Furthermore, the sensor electronics are designed such that they make it possible to mask specific range areas which can be defined. This means that, when an object is located in a previously defined masking-out area of a type such as this, then the sensor electronics do not pass on any corresponding signal via the sensor bus via the safety controller.

Furthermore, a scanner 36 is fitted to the base 12 of the robot 8, pointing towards the rearward boundary device 4. This laser scanner 36 monitors the rearward part of the working area 40 of the robot 8, which is located between the robot 8 and the rearward boundary device 4. The detection area of the laser scanner 36 is approximately a semicircular area of the new. The laser scanner 36 is a position-resolving and time-resolving sensor.

The detection areas of the proximity sensors 20, 22, 24, 26, 28, 30, 32, 34 and of the laser scanner 36 are chosen such that the outer boundary lines of the lobe-like sectors S1, S2, S3, S4, S5, S6, S7, S8 and the semicircular boundary of the detection area S9 of the laser scanner 36 when considered together cover approximately the safety area boundary line 42.

The intention now is to consider that part of the safety area 44 which is covered in the manner described above by the detection areas of the ultrasound proximity sensors 20 to 34. The danger area boundary line 46 subdivides each sector of an ultrasound proximity sensor into two zones. For example, the sector S1 of the ultrasound proximity sensor 20 is divided in this way into an outer safety zone A and an inner danger zone I. A corresponding situation applies to the other sensors. The sector S2 of the sensor 22 is thus subdivided into the outer safety zone B and the inner danger zone K, the sector S3 of the sensor 24 is subdivided into the outer safety zone C and the inner danger zone L, the sector S4 of the sensor 26 is subdivided into the outer safety zone D and the inner danger zone M, the sector S5 of the sensor 28 is subdivided into the outer safety zone E and the inner danger zone N, the sector S6 of the sensor 30 is subdivided into the outer safety zone F and the inner danger zone O, the sector S7 of the sensor 32 is subdivided into the outer safety zone G and the inner danger zone P, and the sector S8 of the sensor 34 is subdivided into the outer safety zone H and the inner danger zone Q.

The position of the robot arm with the tool 10 with respect to the respective danger zone I, K, L, M, N, O, P, Q is transmitted to the safety controller from position sensors which are fitted to the robot arm or to other robot axes.

The method according to the invention will now be explained by joint consideration of FIGS. 1 and 3. In the configuration shown in FIG. 1, a person ME is located in the zone B, which is the outer safety zone associated with the sensor 22 in the sector S2. The tool 10 of the robot 8 is located in the zone P, which is the danger zone associated with the sector S7 of the sensor 32. The safety controller receives position details from the robot controller about the position of the tool 10, and receives information from the sensor electronic assemblies 20 to 34a as to whether objects are or are not in each case located in the zones associated with the ultrasound proximity sensors, as well as are distance at which they are located. The safety controller uses the signals transmitted to it from the sensor electronics 22a of the proximity sensor 22 to identify that an object is located in the safety area B. In the robot controller, the safety controller receives the information that the tool 10 of the robot arm of the robot 8 is located in the zone P. By virtue of the programming, the safety controller knows that zones B and zone P are sufficiently far away from one another that, even if the object identified in zone B were a person, there is no risk at this moment of colliding with the robot arm and the tool 10. The safety controller will therefore do nothing, and the robot 8 continues to operate normally.

The sensor 32 signals via its sensor electronics 32*a* to the safety controller that an object is likewise located in the zone P, that is to say in the danger zone associated with it, specifically the work piece 18, which has been supplied to the robot via the work piece feed device 16 to be processed. On the basis of a training process which was carried out before the commissioning of the manufacturing cell, the information was, however, programmed into the safety controller that objects identified in zones P and G are work pieces which are being supplied via the conveyor belt 16 for processing. The safety controller therefore does nothing when an object is identified in zone P. The geometric shape of the zone P is such that there is no space for a person in addition to the conveyor belt 16 and the work piece 18, so that it is not possible for anyone to be in the zone P and to be endangered by the robot arm.

If the person ME were to move from the zone B via the zones C, D, E into the zone F, then this movement would be identified by the sensors 24, 26, 28 and 30, and would be transmitted to the safety controller. When the person enters zone F, and the robot arm is still working in zone P with the tool 10, then this would cause the safety controller to switch the robot to a slower safety mode in order to preclude any danger to that person if he or she were now to move surprisingly from zone F into zone O, in which he or she would be at acute risk.

If the person ME moves from the zone B back into the zone K, which is the danger zone in sector 2 being monitored by the sensor 22, then the sensor 22 will transmit to the safety controller the information that an object is located in its danger zone K. Since, on the basis of the program which has been entered in the safety controller, this object could be a person, but zone K is not sufficiently far away from zone P in which the robot arm is located at that time, the safety controller will only cause ? to switch to a slower safety mode in order to preclude any danger to a person in zone K. If the person were to move from the zone K closer to the robot arm and the tool 10, that is to say to move via the zones L, M and N to zone O, then the safety controller would shut down the robot at the latest on identification of an object in zone N.

It is evident from the procedure described above that the safety apparatus according to the invention allows considerably more flexible operation of the manufacturing cell than is possible with conventional safety apparatuses. Robot operation is interrupted, or else the robot is slowed down, only when a person is actually located in the immediate vicinity of the robot arm with the tool 10. If the robot arm rotates and the tool 10 now, for example, moves from the sector P to the zone L or even K, the safety controller would react appropriately. In the case of a conventional safety apparatus, either the danger area boundary line 46 would be provided by a fixed mechanical fence, which would prevent a person ME from being able to work at all in this zone, even if he or she were well away from the robot arm.

In the case of the apparatus shown in FIG. 1 and FIG. 3, the proximity sensors 20, 22, 24, 26, 28, 30, 32, 34 have been described as ultrasound sensors. However, they could just as well be microwave sensors as well or they could be a combination of microwave and ultrasound sensors.

The rearward area between the robot and the rearward boundary device 4 is covered over its entire area by the laser scanner 36, as already mentioned above. Since the laser scanner 36 is position-resolved and time-resolved, the position of objects identified anywhere in the entire area there is calculated in this case by means of quite complicated signal processing, which functions approximately in the same way as an image processing algorithm, and this information is transmitted to the safety controller. The advantage of the laser scanner is that only one appliance is needed in order to allow all of a relatively large area to be covered. However, the trade off in this case is the disadvantage of considerably higher costs for the laser scanner and the substantially greater complexity of the sensor evaluation algorithm and electronics required. In the case of the apparatus shown in FIG. 1, the rearward area could likewise also be covered by a further eight proximity sensors oriented to the rear. In addition to the safety controller that has already been mentioned FIG. 3 also shows a PC for the robot with the robot controller and the interaction between the safety controller via the arrow annotating action with the robot controller, as well as signaling of the robot arm position from the position sensors, indicated in FIG. 3 by the arrow annotating position between the robot controller and the safety controller, with this PC being connected to the safety controller, as well as a monitor, which is connected to the PC, for indication and display of the instantaneous safety situation in the manufacturing cell, as well as a configuration tool, which is annotated configuration. The configuration tool is used to configure the safety controller via the PC, that is to say to program it and to transmit parameters such as the detection threshold, sensitivity, local resolution of the sensors, detection threshold etc., to the safety controller. This means that the safety apparatus, whose physical design is shown in FIG. 1 and whose logical systematic design is shown in FIG. 3, may be used extremely flexibly and may be matched to different environmental conditions. This is particularly advantageously evident if the robot 8 were to be used at a new working location. This is because the safety sensors 20, 22, 24, 26, 28, 30, 32, 34, 36 would in fact also be moved with the robot 8 and its base 12. All that would then be required at the new working location would be an adapted configuration of the safety controller, and the robot could continue to operate after a short time, with unrestricted safety. In the case of conventional systems, on the other hand, the mechanical safety vent would have to be re-erected and adjusted, or a monitoring camera would have to be newly installed and adjusted in the area outside the robot, which would be considerably more complicated.

The apparatus according to the invention and the method are also suitable for applications in which process light, such as UV radiation, from welding work, is produced and a protective wall is normally required. From experience, there is also no need for such protective walls.

Figure 2:
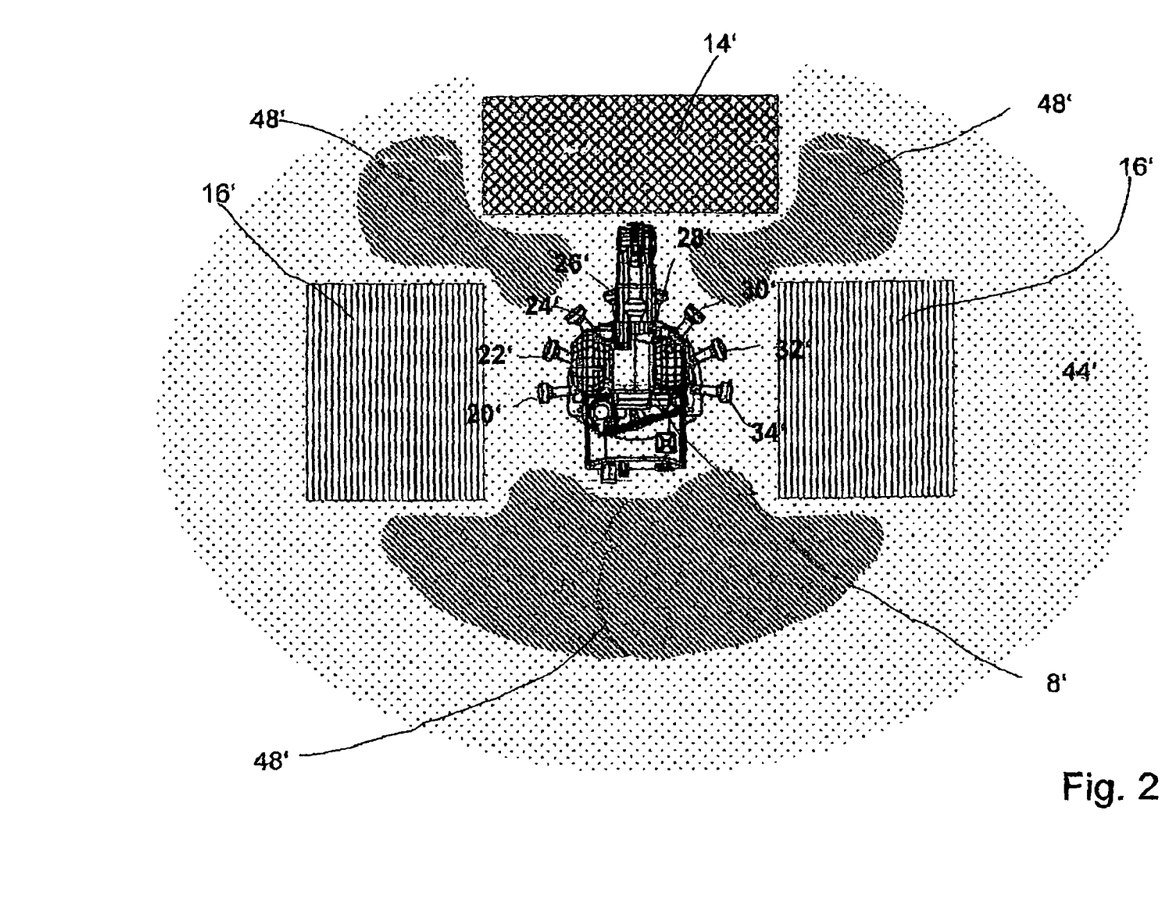
FIG. 2 shows a variant of the apparatus according to the invention as shown in FIG. 1.

Finally, FIG. 2 schematically illustrates the fact that the geometric shape of the safety zones and danger zones is not restricted to a circular shape or a shape in the form of a circle segment, as shown in FIG. 1. Identical elements and components in FIGS. 1 and 2 are annotated with the same reference numbers, but with an apostrophe added to them in FIG. 2. In the physical arrangement of a safety apparatus shown in FIG. 2, the safety area 44—around the robot 8—is elliptical. Two feed devices 16 are arranged, to the right and left of the robot 8, as well as a tool station 14, in the rear area of the robot. The robot 8 once again has eight proximity sensors, optionally in the form of ultrasound or microwave sensors, and annotated 20-, 22-, 24-, 26-, 28-, 30-, 32-, 34-. These proximity sensors once again also each have associated sensor evaluation electronics which, as shown in FIG. 3, interact with the safety controller via a sensor bus. The detection areas of the safety sensors 20-, 22-, 24-, 26-, 28-, 30-, 32-, 34- are now adjusted via their sensor electronics in the safety controller such that the danger zones 48 shown in FIG. 2, all of which have irregular shapes and which essentially extend between the robot 8 and the feed devices 16 and/or the tool station 14, are recorded and covered. An apparatus according to the invention is even able to reliably cover irregular danger zones such as these in a simple and cost-effective manner by using the sensor electronics to mask out corresponding detection zones.

The invention claimed is:

1. An apparatus for protection of a machine-controlled handling appliance having moving parts, comprising:
    a safety sensor system for detection of objects in a working area of the handling appliance;
    a safety controller which interacts with a controller of the handling appliance and, in the process of interacting, controls safety-relevant functions of the handling appliance as a function of signals transmitted from the safety sensor system,
    wherein the safety sensor system includes non-contacting proximity sensors each having respective detection areas so that a safety-relevant part of the working area of the handling appliance is covered by the detection areas of the proximity sensors,
    wherein the proximity sensors respectively comprise at least one sensor with different physical principles of operation with respect to the principles of operation of other proximity sensors among the proximity sensors included in the safety sensor system,
    wherein each proximity sensor determines distance information about the distance of a detected object from the respective proximity sensor,
    wherein the safety controller controls the safety-relevant functions of the handling appliance by outputting the signals, which are based on the distance information respectively determined by the proximity sensors to the controller of the handling device.

2. The apparatus as claimed in claim 1, wherein the safety sensor system includes position-resolving and time-resolving sensors in combination with the non-contacting proximity sensors.

3. The apparatus as claimed in claim 2, wherein the safety sensor system includes mechanical limit switches or contact mats in combination with the non-contacting proximity sensors and the position-resolving and time-resolving sensors.

4. The apparatus as claimed in claim 1, wherein the proximity sensors include at least two sensors selected from the group of an imaging sensor, a microwave sensor, and a radar sensor.

5. The apparatus as claimed in claim 1, wherein the proximity sensors transmit information about the presence of an object in their respective detection area.

6. The apparatus as claimed in claim 5, wherein the proximity sensors suppress information about the presence of an object which is located in their detection area during transmission of the signals to the safety controller if the object is located in a specific permissible distance range from the proximity sensor.

7. The apparatus as claimed in claim 1, wherein the proximity sensors comprise proximity switches with variably adjustable switching distances, so that the proximity switches transmit information about the presence of an object in their respective monitoring area and within a range which corresponds to the respectively selected switching distance, from the proximity sensor to the safety controller.

8. The apparatus as claimed in claim 1, wherein the safety-relevant part of the working area is subdivided into sectors, with each sector having an associated non-contacting proximity sensor or a position-resolving and time-resolving sensor as the sector monitoring sensor, whose detection area corresponds to the sector associated with it.

9. The apparatus as claimed in claim 8, wherein each sector which is associated with one proximity sensor is subdivided into at least two zones of different safety relevance, with the safety relevance corresponding to the distance from the moving parts of the handling appliance.

10. The apparatus as claimed in claim 9, wherein each sector which is associated with one proximity sensor is subdivided into a working zone, a safety zone and a danger zone, in such a manner that the handling appliance is switched off if someone is present in the danger zone and the handling appliance is switched to a slower safety mode if someone is present in the safety zone.

11. The apparatus as claimed in claim 1, wherein the proximity sensors comprise at least one ultrasound sensor.

12. The apparatus as claimed in claim 1, wherein the proximity sensors comprise at least one microwave sensor.

13. The apparatus as claimed in claim 1, wherein the handling appliance is a freely programmable industrial robot.

14. The apparatus as claimed in claim 13, wherein the proximity sensors are fitted to a base of the robot in such a manner that the working area of the robot is monitored from the base, starting from the inside, outwards.

15. The apparatus as claimed in claim 13, wherein information about the position of the robot arm is recorded by position-finding sensors on the robot, and is transmitted to the safety controller.

16. A method for protection of a machine-controlled handling appliance having moving parts, with a safety sensor system being used for detection of objects in a working area of the handling appliance, the safety sensor system including non-contacting proximity sensors, each having respective detection areas so that a safety-relevant part of a working area of the handling appliance is covered by the detection areas of the proximity sensors, the proximity sensors comprising at least one sensor with different physical principles of operation with respect to the principles of operation of other proximity sensors among the proximity sensors included in the safety sensor system, the method comprising:
    controlling safety-relevant handling appliance functions as a function of signals from the safety sensor system;
    determining presence information about the presence of people and/or objects in the working area of the handling appliance zone-by-zone by the safety sensor system;
    determining position information about the position of the moving part or parts of the handling appliance zone-by-zone;
    determining distance information about the distance of a detected object from the respective proximity sensor, and
    wherein the step of controlling of the safety-relevant handling appliance functions includes controlling the safety-relevant handling appliance functions as a function of the determined presence information, the determined position information, and the distance information.

17. The method as claimed in claim 16, wherein the handling appliance is a freely programmable industrial robot with an arm whose working area is partially subdivided into sectors, and each sector is further subdivided into at least two zones of different safety relevance, corresponding to the distance from the moving robot arm, and wherein the determined position information comprises information about the position of the robot arm detected by position sensors on the robot axes.

18. The method as claimed in claim 17, wherein each sector is subdivided into a working zone, a safety zone and a danger zone, and the method further comprises switching off the robot if the safety sensor system identifies the presence of someone in the danger zone, and switching the robot to a slower safety mode if someone is present in the safety zone.

19. The method as claimed in claim 18, comprising if the safety sensor system identifies the presence of someone in a safety zone and, at the same time, the position sensors detect that the robot arm is positioned in the same safety zone or in an adjacent safety zone, switching the robot to a slower safety mode.

20. The method as claimed in claim 17, comprising masking out information about objects from a safety zone or danger zone in which the robot arm is located.

21. The method as claimed in claim 17, comprising masking out information about objects from a safety or danger zone in which parts or supply apparatuses for such parts which are to be handled by the robot are located.

22. An apparatus as claimed in claim 11, wherein the at least one ultrasound sensor has a beam angle of between 10° and 40°, so that that part of the working area of the handling machine which is monitored by the ultrasound sensor is subdivided into sectors with beam angles of between 10° and 40°.

23. The apparatus as claimed in claim 12, wherein the microwave sensors operate using the FMCW (Frequency-Modulated Continuous Wave) method.

24. The apparatus as claimed in claim 23, wherein the at least one microwave sensor is configured for mechanical scanning, and the scanning angle can be recorded by an angle sensor, in such a manner that, in addition to the information about the distance to the object, information is also obtained about the direction in which the object is located.

25. The apparatus as claimed in claim 23, wherein individual elements of an antenna array of the at least one microwave sensor is configured to be driven via a variable phase-shifting network, in such a manner that the main emission direction (main lobe) of the microwave antennas can be scanned by variation of the phases thus, in addition to the information about the distance to the object, also obtaining information about the direction in which the object is located.

26. The apparatus as claimed in claim 15, wherein the position-finding sensors are on the robot axes.

27. The method as claimed in claim 16, wherein the proximity sensors include at least two sensors selected from the group of an imaging sensor, a microwave sensor, and a radar sensor.

* * * * *